(12) United States Patent
Agashe

(10) Patent No.: US 8,803,023 B2
(45) Date of Patent: Aug. 12, 2014

(54) SEAM WELDING

(75) Inventor: Soumitra V. Agashe, Perter, IN (US)

(73) Assignee: ISG Technologies, Chicago, IL (US)

( * ) Notice: Subject to any disclaimer, the term of this patent is extended or adjusted under 35 U.S.C. 154(b) by 1225 days.

(21) Appl. No.: 12/263,649

(22) Filed: Nov. 3, 2008

(65) Prior Publication Data

US 2009/0139966 A1 Jun. 4, 2009

Related U.S. Application Data

(60) Provisional application No. 60/991,044, filed on Nov. 29, 2007.

(51) Int. Cl.
*B23K 11/00* (2006.01)

(52) U.S. Cl.
USPC ............... 219/78.01; 219/85.12; 219/85.13

(58) Field of Classification Search
USPC ............... 219/91.1, 91.2, 117.1, 118, 78.01, 219/85.12, 85.13
See application file for complete search history.

(56) References Cited

U.S. PATENT DOCUMENTS

| | | | |
|---|---|---|---|
| 796,938 A | 8/1905 | Schuhmann et al. | |
| 1,252,144 A | 1/1918 | Murray, Jr. et al. | |
| 1,688,360 A | 10/1928 | Steigerwald | |
| 2,162,229 A | 6/1939 | Remington | |
| 2,262,705 A | 11/1941 | Tuttle | |
| 2,464,981 A | 3/1949 | Leathers at al. | |
| 3,021,416 A | 2/1962 | Mallett at al. | |
| 3,564,189 A | 2/1971 | Rhodes | |
| 3,632,949 A * | 1/1972 | Thorne | 219/64 |
| 3,916,141 A * | 10/1975 | Czohara | 219/78.11 |
| 4,376,883 A * | 3/1983 | Dao et al. | 219/109 |
| 4,389,556 A * | 6/1983 | Nozawa et al. | 219/64 |
| 4,402,769 A | 9/1983 | Beigay et al. | |
| 4,734,555 A * | 3/1988 | Ferguson | 219/109 |
| 4,788,405 A * | 11/1988 | Haigh et al. | 219/109 |

(Continued)

FOREIGN PATENT DOCUMENTS

| | | | | |
|---|---|---|---|---|
| JP | 54 099050 A | | 8/1979 | |
| JP | 11058026 A | * | 3/1999 | ............ B23K 11/24 |
| KR | 2000 0041277 A | | 7/2000 | |

OTHER PUBLICATIONS

Taylor Winfield, Twin Lap Seam Welder brochure (2 pages).

(Continued)

*Primary Examiner* — Henry Yuen
*Assistant Examiner* — Ayub Maye
(74) *Attorney, Agent, or Firm* — Berenato & White, LLC

(57) ABSTRACT

A process is provided for scam welding advanced high strength steel sheets together. Respective end portions of first and second advanced high strength steel sheets are placed in overlapping contact with one another, and subjected to first and second weld passes. In the first weld pass, a seam welder including weld electrodes operate at a first-pass applied current and a first-pass pressure and are moved relative to the overlapping end portions at a first-pass carriage speed to establish a weld seam containing a weld nugget with a martensite phase. In the second weld pass, the weld electrodes operate at a second-pass applied current and a second-pass pressure and move relative to the weld seam at a second-pass carriage speed selected to fuse microcracks, lap openings, and porosity in the seam, relieve the residual stress in the joint, and temper the martensite phase of the weld nugget, and thereby form a weld joint.

30 Claims, 1 Drawing Sheet

(56) References Cited

U.S. PATENT DOCUMENTS

| | | | |
|---|---|---|---|
| 5,021,626 A * | 6/1991 | Boyd et al. | 219/109 |
| 5,676,862 A | 10/1997 | Matteson | |
| 7,232,053 B2 | 6/2007 | McCrink | |
| 7,731,808 B2 * | 6/2010 | Tomida et al. | 148/320 |
| 2002/0068182 A1 * | 6/2002 | Kelch et al. | 428/463 |
| 2005/0230361 A1 * | 10/2005 | Wang et al. | 219/117.1 |
| 2006/0124907 A1 | 6/2006 | Takada et al. | |
| 2007/0071997 A1 | 3/2007 | Goto et al. | |
| 2008/0041922 A1 * | 2/2008 | Forrest et al. | 228/141.1 |
| 2008/0311421 A1 * | 12/2008 | Watson et al. | 428/654 |

OTHER PUBLICATIONS

Bob Matteson, New Process—Twinlap Seam Welder, Presented at the Galvanizers Association, Oct. 3-6, 2004 (12 pages).

Schaeffler, Introduction to Advanced High Strength Steels, Part I: Grade Overview, Aug. 9, 2005 (4 pages).

Advanced High Strength Steel (AHSS) Application Guidelines, International Iron and Steel Institute, Committee on Automotive Applications, Jun. 2006 (p. 1-1 to 1-8).

Curt Horvath, The Future Revolution in Automotive High Strength Steel Usage, GM Corporation, www.autosteel.org, Feb. 18, 2004 (24 pages).

* cited by examiner

SEAM WELDING

CROSS-REFERENCE TO RELATED APPLICATION(S)

This application claims the benefit of priority of U.S. provisional application Ser. No. 60/991,044 filed Nov. 29, 2007, the complete disclosure of which is incorporated herein by reference.

FIELD OF THE INVENTION

The present invention relates to a multiple-pass operation of seam welding steel sheets, especially high strength steel sheets.

BACKGROUND OF THE INVENTION

Steel sheets are processed continuously in continuous galvanizing, continuous annealing, and tin mill lines of steel cold mills. In order to optimize the efficiency of the mills, the steel sheets are joined end to end via lap-seam welding. Specifically, the tail or trailing end of a preceding (first) coil and the head end of an incoming (second) coil are joined together at the entry end of the mill, thereby creating a continuous joined sheet that may be processed continuously in the mill at a much higher efficiency than would be realized if the sheets were individually processed. A conventional lap-seam or mash-seam welder may be used effectively for welding low carbon and high strength low alloy ("HSLA") grade steel. The weld is formed in a single pass, in which a welding device, such as a pair of opposing electrodes mounted on a carriage, moves along overlapping portions of the HSLA grade steel to form a weld, before returning to its home position in idle mode.

Recently, there has been an increased demand for advanced high strength steels (AHSS) generally having a tensile strength greater than that of HSLA grade steel. AHSS are characterized by their high carbon equivalent, high tensile strength, and high electrical resistivity. In the automobile industry, for example, the use of AHSS and their heightened tensile strengths in a vehicle frame permits the production of automotive components with reduced weight and accompanying fuel efficiency improvements without adversely affecting the safety of the vehicle.

It is particularly advantageous and efficient to process AHSS in a continuous manner for performing operations such as continuous pickling and continuous galvanizing to meet the requirements of automotive customers. However, the application of conventional welding apparatus and operations, such as single-pass lap seam welding process, to galvanized TRansformation Induced Plasticity (TRIP) grade AHSS results in a brittle and weak weld due to martensite and oxide formation. Further, very high alloy content (high carbon equivalent) and high resistivity of AHSS makes these grades ultra-sensitive to welding parameters. Microstructure studies have shown that AHSS grade welds often undergo excessive surface heating (expulsion) and generate hot microcracks, porosity, and inadequate fusion when subjected to the single weld pass employed for HSLA. Performance criteria required for safe and reliable processing through the mill are generally not satisfied by the brittle welds created by conventional single-pass lap seam welding practices. Failure of the weld during mill processing may cause shut down of the line for relatively short (e.g., 1 hour) or extended (e.g., 1 day) periods, depending on the location and severity of the weld break.

To remedy this problem, a solution has been proposed in which a low carbon HSLA grade steel "stringer" coil is interposed between two AHSS (e.g., TRIP) coils so that the TRIP-to-TRIP weld is replaced by stronger and more reliable HSLA-to-TRIP and TRIP-to-HSLA welds for indirectly joining the AHSS coils together. Specifically, the tail end of the preceding HSLA coil is joined to the head end of a TRIP coil and the tail end of the TRIP coil is joined to the head end of another HSLA insert coil. The additional labor and materials required for implementation of this remedy reduces overall productivity and increases expenses. Furthermore, such a procedure requires scheduling and stocking an inventory of the necessary HSLA insert coils. Other costs include quality defects due to unstable processing conditions, and greater equipment wear and tear.

Another proposed remedy to the welding of AHSS is the application of induction heating after welding. This alternative solution requires the installation of an induction heating unit or separate station requiring capital investment and significant additional processing time to cool down the weld.

SUMMARY OF THE INVENTION

According to a first aspect of the invention, a process is provided for seam welding advanced high strength steel sheets together. Respective end portions of first and second advanced high strength steel sheets are placed in overlapping contact with one another. The overlapping contact end portions are subjected to a first weld pass of a seam welder including weld electrodes operating at a first-pass applied current and a first-pass pressure and moving relative to the overlapping end portions at a first-pass carriage speed. The first weld pass establishes a weld seam containing a weld nugget having a martensite phase. The weld seam is subjected to a second weld pass of the seam welder in which the weld electrodes operate at a second-pass applied current and a second-pass pressure, and are moved relative to the weld seam at a second-pass carriage speed selected to fuse microcracks, lap openings, and porosity in the weld seam, relieve joint stress, and temper the martensite phase of the weld nugget and thereby establish a reliable weld joint suited for continuous processing.

According to a second aspect of the invention, a process for seam welding steel sheets together is provided. Respective end portions of first and second steel sheets are placed in overlapping contact with one another, and subjected to a first weld pass of a seam welder comprising weld electrodes operating at a first-pass applied current and a first-pass pressure and being moved relative to the overlapping end portions at a first-pass carriage speed to establish a weld seam. The weld seam is then subjected to a second weld pass of the seam welder in which the weld electrodes operate at a second-pass applied current that is lower than the first-pass applied current and a second-pass pressure that is equal to or higher than the first-pass pressure and in which the weld electrodes move relative to the weld seam at a second-pass carriage speed that is greater than the first-pass weld speed to form a weld joint.

A third aspect of the invention provides a welded seam of advanced high strength steel sheets, the welding seam having an energy absorption capability measured by a ball-punch test ASTM 643-84 of at least 50% of an unwelded portion of the advanced high strength steel sheets tested under identical conditions.

A fourth aspect of the invention resides in a method of continuously processing joined advanced high strength steel sheets. The method comprises placing respective end portions of first and second advanced high strength steel sheets in overlapping contact with one another, and subjecting the overlapping contact end portions to a first weld pass of a seam welder including weld electrodes operating at a first-pass applied current and a first-pass pressure and moving relative to the overlapping end portions at a first-pass carriage speed. The first weld pass establishes a weld seam containing a weld nugget having a martensite phase. The weld seam is subjected to a second weld pass of the seam welder in which the weld electrodes operate at a second-pass applied current and a second-pass pressure, and are moved relative to the weld seam at a second-pass carriage speed selected to fuse microcracks, lap openings, and porosity in the weld seam, relieve joint stress, and temper the martensite phase of the weld nugget and thereby establish a reliable weld joint suited for continuous processing. The joined steel sheets are then subjected to a continuous processing step.

A fifth aspect of the invention is directed to a method of continuously processing joined steel sheets. The method comprises placing respective end portions of first and second steel sheets in overlapping contact with one another, and subjecting the overlapping contact end portions to a first weld pass of a seam welder including weld electrodes operating at a first-pass applied current and a first-pass pressure and moving relative to the overlapping end portions at a first-pass carriage speed. The first weld pass establishes a weld seam containing a weld nugget having a martensite phase. The weld seam is subjected to a second weld pass of the seam welder in which the weld electrodes operate at a second-pass applied current that is lower than the first-pass applied current and a second-pass pressure that is equal to or higher than the first-pass pressure and in which the weld electrodes move relative to the weld seam at a second-pass carriage speed that is greater than the first-pass weld speed to form a weld joint. The second pass conditions are selected to fuse microcracks, lap openings, and porosity in the weld seam, relieve joint stress, and temper the martensite phase of the weld nugget and thereby establish a reliable weld joint suited for continuous processing. The joined steel sheets are then subjected to a continuous processing step.

Other aspects of the invention will become more apparent upon considering the detailed description of exemplary embodiments and exemplary methods of the invention described below and the accompanying drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawing.

DETAILED DESCRIPTION OF EXEMPLARY EMBODIMENT(S) OF THE INVENTION

Figure 1:
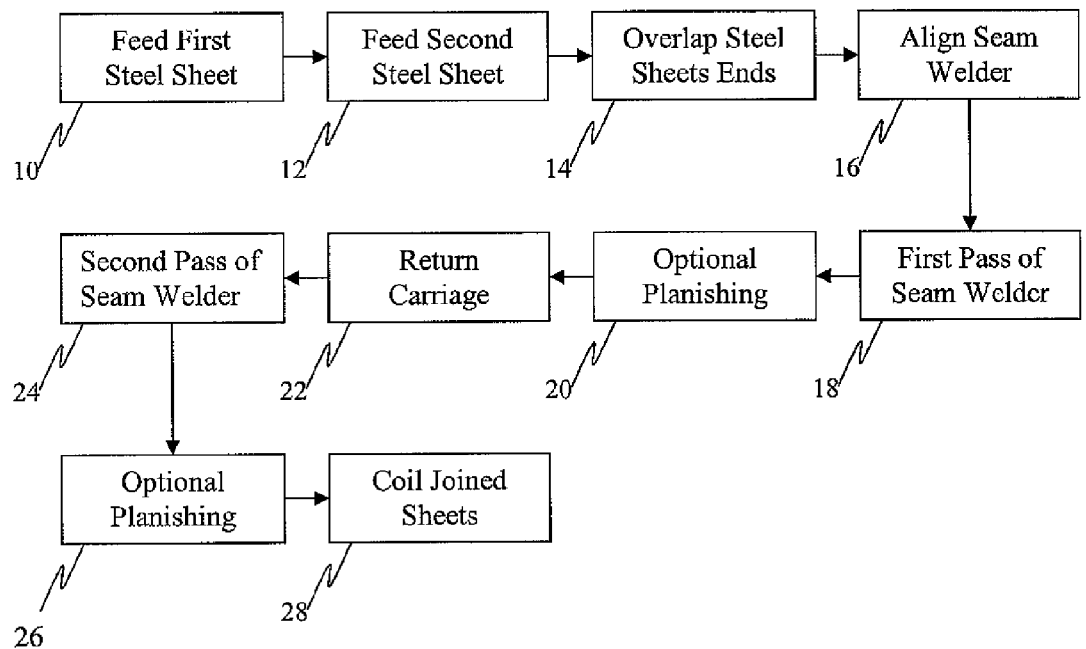
FIG. 1 is a flow diagram of a process according to an embodiment of the invention.

Reference will now be made in detail to the presently exemplary embodiments and methods of the invention as illustrated in the accompanying drawing. It should be noted, however, that the invention in its broader aspects is not limited to the specific details, representative devices and methods, and illustrative examples shown and described in this section in connection with the exemplary embodiments and methods.

The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

An embodiment of the present invention provides a double-pass lap-seam welding technique for welding advanced high strength steels ("AHSS"). AHSS are multiphase steels containing microstructures of ferrite, martesite, bainite, and/or retained austenite in quantities sufficient to affect the mechanical properties of the steel. AHSS have high strain hardening properties, which are responsible for an excellent combination of high strength and high formability. AHSS also have a bake hardening effect, which is the increase in yield strength resulting from elevated temperature aging after prestraining. AHSS generally can be produced by adding manganese, silicon, and aluminum and/or chromium to increase hardenability, and by controlling the cooling rate of the austenite or austenite plus ferrite phase. Categories of AHSS are described in Section 1 of the International Iron and Steel Institute (AISI) "Advanced High Strength Steel (AHSS) Application Guidelines," Version 3, September 2006, the disclosure of which is incorporated herein by reference. The guidelines generally define the different categories of AHSS as follows:

1. Dual Phase (DP) steel contains a ferritic matrix containing a hard martensitic second phase in the form of islands. DP steels are produced by controlled cooling from the austenite phase or from the two-phase ferrite plus austenite phase to transform some austenite to ferrite before a rapid cooling transforms the remaining austenite to martensite. Carbon strengthens the martensite, as do silicon and phosphorus. Manganese, chromium, molybdenum, vanadium, and nickel may be added individually or in combination to increase hardenability. Generally, DP steels have a tensile strength of about 500 MPa to about 1000 MPa.

2. Transformation Induced Plasticity (TRIP) steel contains austenite embedded with a primary matrix of ferrite, and martensite, bainite and retained austenite in varying amounts TRIP steels typically require the use of an isothermal hold at an intermediate temperature, which produces some bainite. Silicon and/or aluminum are usually present to accelerate the ferrite/bainite formation. TRIP steels generally have a tensile strength of about 600 MPa to about 800 MPa.

3. Complex Phase (CP) steels contain small amounts of martensite, retained austenite and pearlite with a ferrite/bainite matrix. Micro alloying elements such as Ti and Cb are preferred for grain refinement. CP steels generally have a tensile strength of about 800 MPa or greater, e.g., about 800 MPa to about 1000 MPa.

4. Martensitic Steels (MS) are created during quenching or cooling by transforming the austenite to martensite. MS steels are characterized by a martensitic matrix containing small amounts of ferrite and/or bainite. Manganese, silicon, chromium, molybdenum, boron, vanadium, and nickel may be used in various combinations to increase hardenability. MS steels generally have a tensile strength of about 900 MPa to about 1700 MPa.

AHSS differ from conventional high strength steels (HSS) in that the latter are single phase ferritic steels. Categories of conventional steels are Low Carbon (LC), Bake Hardenable (BH), Solid Solution Strengthened (SSS), and High Strength Low Alloy (HSLA) steels.

The AHSS for which the present invention is suited has a tensile strength greater than that encountered with HSS. The minimum tensile strength may be, for example, 500 MPa. Examples of advanced high-strength steels for which embodiments of the invention would be an especially useful tool are disclosed in U.S. Patent Application Publication No. 2006/0124907 (application Ser. No. 10/542,393) to Takada et al. and U.S. Patent Application Publication No. 2007/0071997 (application Ser. No. 10/557,263) to Goto et al., the complete disclosures of which are incorporated herein by reference.

Figure 2:
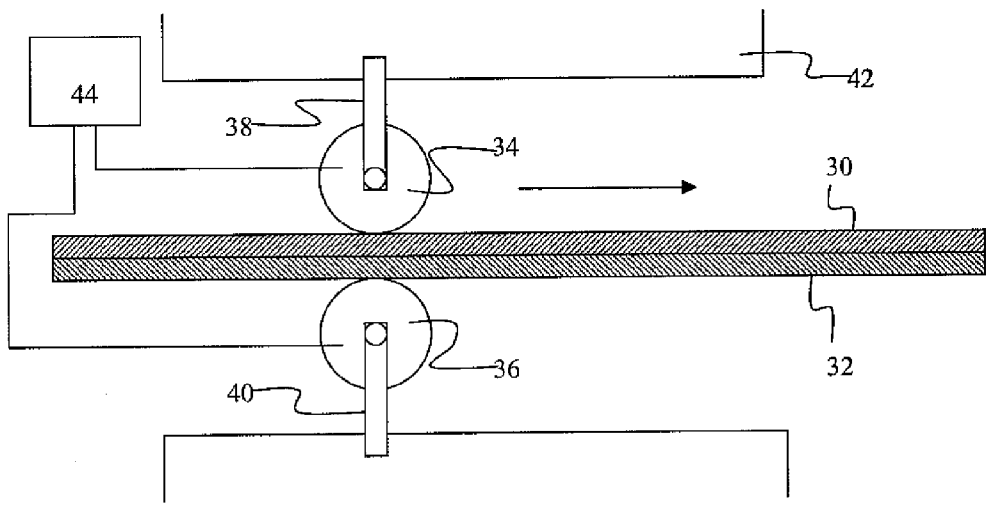
FIG. 2 is a schematic diagram of a lap welding apparatus suitable for use with the present invention.

Generally, the process according to an exemplary embodiment of the invention involves placing first and second AHSS sheet end portions in overlapping contact with one another, and subjecting the overlapping end portions to a multiple pass welding operation. Referring particularly to FIG. 1, this embodiment comprises feeding 10 a first sheet of AHSS into a process line to situate the tail end of the first sheet in a welder. A second sheet of AHSS is then uncoiled 12 from its roll and fed into the process line and its leading end is overlapped 14 with the trailing end of the first sheet. The term "sheets" encompasses various substrates, including strips. FIG. 2 illustrates a side sectional view of first and second overlapping end portions 30, 32 of first and second AHSS grade steel sheets contacting one another. It should be understood that additional sheets may be subsequently introduced into the continuous process and joined successively. For example, the leading end of a third sheet of AHSS may be overlapped and joined to the trailing end of the second sheet after the first and second sheets have been joined, and so on. In the event that the second sheet is only partially uncoiled prior to joining to the first sheet, subsequent to the welding, the second sheet will continue to be uncoiled from its roll until its trailing end is exposed for joining to the leading end of the third sheet.

The surface regions of the first and second sheets are placed in direct surface to surface contact with one another to establish the overlapping end portions. Clamps (not shown) secure a predetermined overlapped length of strip ends to avoid relative movement between and misalignment of the steel sheets. The clamps may possess, for example, brass or Teflon® insert pads used to increase friction between the clamp and strip surface and provide better gripping. As well known in the art, the AHSS sheets may be provided with loops or slack on the opposite sides of the clamps to reduce or eliminate overlap slippage.

In order to obtain a weld joint having a relatively uniform width, it may be desirable to provide overlap compensation, whereby due to heat effects and slippage during weld processing the finish side may be provided with a slightly greater overlap than the start side. Overlap compensation is known in the art. Although not particularly limited, the overlapping dimension for a lap seam welding process is, for example, greater than 1 to 1.5 times the sheet thickness, for example, a 3.0 mm overlap for a steel sheet gauge of 15 mm. The overlapping dimension for mash seam welding processes is generally less than that for lap seam welding, e.g., 1 to 1.5 times the sheet thickness, for example, 2.0 mm overlap for a steel sheet gauge of 1.5 mm.

The overlapping end portions of the first and second AHSS sheets are aligned 16 with a welding apparatus. It should be understood that a wide selection of welding apparatus that are capable of multiple-pass, especially double-pass, operation may be employed in carrying out the present invention. For example, the present invention may be practiced with C-flat seam welders, prep-lap welders, and narrow-lap welders. Examples of manufacturers of suitable welders include Taylor-Winfield Corp. (United States), Hugo Miebach GmBH (Germany), Seimens VAI (Germany), and Mitsubishi Electric (Japan). An example of a welding apparatus adaptable for use in the process embodied herein is disclosed in U.S. Pat. No. 3,564,189, the disclosure of which is incorporated herein by reference. The welder may be equipped with an automated system, such as a programmable logic control PLC) for automatically controlling movement and timing of the welding apparatus.

Referring back to FIG. 2, the welding apparatus may comprise a first electrode 34 aligned, usually vertically, with an opposite second electrode 36 for respectively engaging opposite sides of the overlapping end portions. The electrodes 34, 36 may be embodied, for example, as rollers or wheels. Weld wheels typically have diameters in a range of about 6 inches to about 30 inches, and widths of from about ⅛ inch to about 1 inch. Weld wheels may be made from RWMA Class II or RWMA Class III copper and may have a circumferential profile that is flat or a truncated-cone type. Weld wheels may be water-cooled or air-cooled. It should be understood that the invention is not necessarily limited to such dimensions, materials, and embodiments. The electrodes are mounted on supports 38, 40, such as vertically reciprocal rods. The supports 38, 40 are mounted on a carriage 42 that is movable relative the overlapping end portions for carrying out the welding operation. Generally, the carriage moves the electrodes relative to the overlapping end portions in a direction that is transverse to the direction of travel of the steel sheets. The electrodes are connected to opposite terminals of a power source 44, e.g., windings of a welding transformer. The welding machine can be operated in Alternating Current (AC) or Mid-frequency Direct Current (MFDC) mode.

The electrodes or weld wheels preferably are clean and geometrically close to the original machine profile prior to the first weld pass. Also prior to the first weld pass, the operator may choose the option of pre-planishing or swaging the AHSS sheets. During the first pass of the seam welder 18, the weld electrodes operate at a first-pass applied current and a first-pass pressure. The weld electrodes are moved relative to the overlapping end portions at a first-pass carriage speed. The passage of electric current between electrodes and through the overlapping metal fuses the overlapping end portions to establish a weld seam having a weld nugget comprising a martensite phase. As referred to herein, the term "relative" movement comprises movement of the weld electrodes while maintaining the overlapping end portions (or weld seam in the second pass) stationary, or movement of the overlapping end portions (or weld seam in the second pass) while maintaining the weld electrodes stationary, or movement of both the weld electrodes and the overlapping end portions (or weld seam in the second pass). Both weld passes may be fully automated.

Optionally, a post-planishing step 20 may be carried out concurrently with or immediately subsequent to the first welding pass. Planishing rollers mounted on the carriage in alignment with the electrodes respectively engage the weld seam from opposite sides to apply pressure to the weld nugget. Post-planishing after the first pass may have the effect of improving the smoothness and/or decreasing the thickness of the weld seam to more closely approximate the thickness of the individual steel sheets. Post-planishing also relieves some of the residual stress in the joint and fuses micro-cracks in the weld area. Generally, a lap welding technique including a post-planishing stage is known in the art as a mash-seam welding technique. The thickness of the welded seam may be decreased to, for example, about 110% of the thickness of the individual sheets. Reducing the thickness of the weld seam to approach or equal that of the sheets allows for the welding current in the second pass to be distributed evenly across the weld seam. Without post-planishing, the weld wheels may show pickup due to arcing between the electrodes and surface of the non-planished welded seam. The post-planishing pressure may be, for example, 1.2 to 2 times the welder wheel pressure.

After the first weld pass, the carriage is returned 22 to the starting side of the weld seam. The return path is identical though opposite in direction to the first weld pass. The carriage traces the weld seam along its return path, but is set in an idle mode and the electrodes are not brought into contact with the weld seam. The carriage may be returned to its start (home) position at its maximum speed in order to decrease overall welding time. The return step is advantageous because the temperature gradient from the first pass is such that the home end of the weld seam at which the first weld pass started is relatively cooler than the opposite end of the weld seam at which the first weld pass finished will be hotter. It has been found that the quality of the weld joint is improved by starting the second pass at the home end to be able to maintain the temperature profile created by the first pass. However, it is within the scope of the invention to omit the return step and begin the second pass at the end of the weld seam at which the first weld pass finished.

The weld seam is then subjected to a second weld pass with the seam welder 24, again with automated control. The second weld pass generally duplicates the path of the first weld pass along the weld seam. The clamps remain closed throughout the two welding passes to ensure that the second pass is over the weld seam to replicate the path taken during the first-pass. During the second weld pass, the weld electrodes operate at a second-pass applied current and a second-pass pressure, and the weld electrodes are moved relative to the weld seam at a second-pass speed. The operating conditions of the second pass may be selected to fuse microcracks, lap openings, and porosity in the seam, to relieve the residual stress in the joint, to temper the martensite phase of the weld nugget formed in the first pass for reducing the brittleness and relieving residual stresses in the joint, and to reduce cycle time. Compared to the first weld pass, the welding parameters for the second pass preferably are characterized by one or more of the following: an about 20-80% (e.g., 50%) decrease in welding current, the same or higher (e.g., up to 5% higher) weld head pressure, and about 100% or greater of the carriage speed relative to the first-pass speed.

Optionally, the second pass is preceded by a pre-planishing stage and/or followed by a post-planishing stage 26, which may be carried out as described above with respect to stage 20.

A benefit of practicing the multi-pass welding operation as described herein is that overall micro hardness distribution across the weld joint is more uniform from the parent material through the heat-affected zone and into the weld nugget. The smooth transition in micro hardness at the seam increases the joint performance by eliminating weak spots across the seam and distributing the load in the joint uniformly. Additionally, weld toughness is increased due to tempering of the martensite formed in the first pass.

The joined AHSS sheets may be processed through the line and recoiled at stage 28. A typical coil length varies in length from 3000 feet to 7000 feet, depending on its thickness. The seam welding process operations described herein may be used on a variety of lap-seam, mash-lap, prep-lap, and narrow-lap welders from various manufacturers. The continuous production line in which the joined AHSS steel sheets are treated may include, for example, hot-dip galvanizing, electro-galvanizing, galvannealing, continuous annealing, tin plating, coil build up, preparation and inspection, side-trimming, chrome-plating, and other coating or continuous processing operations. The double-pass seam welding method can be applied to industries including but not limited to steel manufacturing, automotive manufacturing, metal processing, sheet fabrication, construction, etc.

The resulting weld seam desirably has an energy absorption capability, as measured on the finished seam by a ball-punch test ASTM 643-84, of at least 50% of the energy absorption capability of the body (that is, an unwelded portion) of the advanced high strength steel sheet. The energy absorption capability may be at least 70%, or as high as 80% or greater, than the energy absorption capability of an unwelded portion of the advanced high strength steel sheets tested under identical conditions. The comparative testing may be performed on a parent AHSS sheet, that is, either the steel sheet prior to its introduction into the welding process or an MISS sheet of identical grade and thickness which has not been subject to weld joining.

Referring back to the first weld pass of stage 18, the applied current, the weld head pressure, and the carriage speed selected are dependent upon the thickness and composition of the AHSS sheet and are inter-dependent upon one another Examples are provided in Table I below as to suitable process parameters for various gauge TRIP steel. Generally, the first pass performed on the overlapping end portions of predetermined gauge AHSS sheets requires a lower weld current, greater weld head pressure, and slower carriage speed than is required to obtain a comparable energy absorption capability for an identical thickness HSLA steel sheet welded using a conventional one-pass process. As referred to herein, the comparable energy absorption capability is measured using the aforementioned ball-punch test ASTM 643-84. For example, to achieve an energy absorption (as measured by ball-punch test ASTM 643-84) at a weld joint of overlapping 1 mm gauge AHSS sheets that is at least 50% of the energy absorption capability of the AHSS sheet body, the first weld pass should be carried out at a lower applied current, a greater weld head pressure, and a slower carriage speed than is required in a single-pass conventional process for achieving an energy absorption at a weld seam of overlapping 1 mm gauge HSLA sheets that is at least 50% of the energy absorption capability of the HSLA sheet body.

The process embodied herein improves the quality of the steel processed in line by providing continuous and stable processing conditions. Further, the embodied process also improves line productivity by eliminating low carbon insert coils for connecting the AHSS coils. Other advantages of exemplary embodiments of the present invention include reduced coil transportation costs, reduced coil inventory, increased line time availability, high efficiency downstream processing, and flexible coil scheduling. Additionally, existing production lines may be modified to practice the exemplary embodiment with little or no capital investment.

It should be understood that although low carbon insert coils may be eliminated, it is within the scope of the invention to weld different gauge AHSS coils to one another. For example, the thickness of the steel sheets may be the same or different from one another by, for example, 0.2 mm, and may each fall within a range of about 0.5 mm to about 3.0 mm. It is also within the scope of the invention to weld AHSS steel sheets of different compositions (grades) to one another.

EXAMPLES

Examples 1-6

Table 1 sets forth parameters for exemplary double-pass welding operations carried out on various gauges of AHSS galvanized TRIP grade steel (780 MPa tensile strength) according to embodiments of the present invention.

TABLE 1

|     |                              |                              | First Weld Pass             |                |                   | Second Weld Pass            |                |                   |
| --- | ---------------------------- | ---------------------------- | --------------------------- | -------------- | ----------------- | --------------------------- | -------------- | ----------------- |
| Ex. | 1st Coil<br>Gauge<br>(inch) | 2nd Coil<br>Gauge<br>(inch) | Current<br>(Primary<br>Amps) | Speed<br>(imp) | Pressure<br>(psi) | Curret<br>(Primary<br>Amps) | Speed<br>(ipm) | Pressure<br>(psi) |
| 1   | 0.039                        | 0.039                        | 760                         | 120            | 80                | 350                         | 300            | 80                |
| 2   | 0.047                        | 0.047                        | 760                         | 120            | 80                | 350                         | 300            | 80                |
| 3   | 0.055                        | 0.055                        | 760                         | 90             | 85                | 400                         | 300            | 90                |
| 4   | 0.063                        | 0.063                        | 760                         | 90             | 85                | 400                         | 300            | 90                |
| 5   | 0.071                        | 0.071                        | 760                         | 80             | 90                | 400                         | 300            | 90                |
| 6   | 0.079                        | 0.079                        | 760                         | 80             | 90                | 400                         | 300            | 90                |

Example 7 and Comparative Example A

Comparative Example A of high strength low alloy steel was subjected to a conventional single-pass processing technique using the parameters identified below in Table 2. Example 7 of galvanized TRIP grade steel (780 MPa tensile strength) was subjected to a double-pass process technique using the parameters identified below in Table 2 and the operations described herein.

TABLE 2

|                          | Comparative<br>Example A (HSLA) | Example 7<br>(AHSS) | % Change      |
| ------------------------ | ------------------------------- | ------------------- | ------------- |
| Gauge (inch)             | 0.055                           | 0.055               |               |
| Overlap (inch)           | 0.1875                          | 0.1875              |               |
| First Pass               |                                 |                     |               |
| Current (primary amps)   | 870                             | 760                 | 13% reduction |
| Speed (ipm)              | 230                             | 90                  | 61% reduction |
| Pressure (psi)           | 60                              | 85                  | 42% increase  |
| Second Pass              |                                 |                     |               |
| Current (primary amps)   | N/A                             | 400                 | N/A           |
| Speed (ipm)              | N/A                             | 300                 | N/A           |
| Pressure (psi)           | N/A                             | 90                  | N/A           |

A ball-punch test was used to determine the weld joint performance of Example 7 under mechanical loading. The test (ASTM 643-84) induced combined bending and tension loads on the weld seam until fracture. Specifically, an instrumented ball-punch tester measures the peak load at joint failure with a load cell. The displacement of the plunger at failure is also recorded by a displacement sensor. A combination of the two readings gives an estimate of the energy absorbed by the weld prior to failure. All readings are an average of at least 5 tests along the weld seam.

TABLE 3

| Steel Sample        | Thickness<br>(inch) | Peak<br>load<br>(lbs) | Displacement<br>(inch) | Estimated<br>Energy Absorbed<br>(lbs-inch) |
| ------------------- | ------------------- | --------------------- | ---------------------- | ------------------------------------------ |
| AHSS Weld<br>Joint  | 0.078"              | 8249                  | 0.286                  | 2357                                       |
| AHSS parent-/body   | 0.078"              | 10950                 | 0.302                  | 3307                                       |

The energy absorbed by the weld prior to fracture was at least 50 percent (actually 71.26 percent) of the energy absorbed by the parent material under similar testing conditions.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A process for seam welding advanced high strength steel sheets together, comprising:
    placing respective end portions of first and second advanced high strength steel sheets in overlapping contact with one another to provide overlapping end portions with opposite first and second sides;
    subjecting the overlapping end portions to a first weld pass of a seam welder comprising weld electrodes operating at a first-pass applied current and a first-pass pressure and being moved relative to the overlapping end portions from the first side to the second side of the overlapping end portions at a first-pass carriage speed to pass electric current through the overlapping end portions and establish a weld seam comprising a weld nugget comprising a martensite phase; and
    subsequent to the first weld pass, starting at either the first side or the second side of the overlapping end portions and subjecting the weld seam to a second weld pass of the seam welder in which the weld electrodes operate at a second-pass applied current that is lower than the first-pass applied current and at a second-pass pressure and move relative to the weld seam at a second-pass carriage speed selected to pass electric current through the overlapping end portions and fuse microcracks, lap openings, and porosity in the weld seam, relieve the residual stress in the weld seam, and temper the martensite phase of the weld nugget, and thereby forming a weld joint.

2. The process of claim 1, further comprising:
    subsequent to the first weld pass, returning the seam welder to the first side of the overlapping end portions at which the first weld pass was started prior to the second weld pass, wherein said second weld pass is started at the first side.

3. The process of claim 1, wherein the advanced high strength steel sheets comprise carbon, manganese, silicon, and an element selected from the group consisting of aluminum and chromium.

4. The process of claim 1, wherein at least one of the advanced high strength steel sheets comprises Dual Phase steel.

5. The process of claim 1, wherein at least one of the advanced high strength steel sheets comprises Transformation-Induced Plasticity steel.

6. The process of claim 1, wherein at least one of the advanced high strength steel sheets comprises Complex Phase steel.

7. The process of claim 1, wherein at least one of the advanced high strength steel sheets comprises Martensitic steel.

8. The process of claim 1, wherein the weld joint has an energy absorption capability measured by a ball-punch test ASTM 643-84 of at least 50% of an unwelded portion of the advanced high strength steel sheets tested under identical conditions.

9. The process of claim 1, wherein the weld joint has an energy absorption capability measured by a ball-punch test ASTM 643-84 of at least 70% of an unwelded portion of the advanced high strength steel sheets tested under identical conditions.

10. The process of claim 1, wherein the weld joint has an energy absorption capability measured by a ball-punch test ASTM 643-84 of at least 80% of an unwelded portion of the advanced high strength steel sheets tested under identical conditions.

11. The process of claim 1, wherein the first and second advanced high strength steel sheets each have a respective thickness in a range of about 0.5 mm to about 3.0 mm.

12. The process of claim 1, wherein:
the second-pass pressure is equal to or higher than the first-pass pressure; and
the second-pass carriage speed is equal to or greater than the first-pass weld carriage speed.

13. The process of claim 1, wherein the second-pass applied current is lower than and approximately 20 to approximately 80 percent of the first-pass applied current.

14. The process of claim 1, wherein the second-pass weld carriage speed is equal to or greater than the first-pass carriage speed.

15. The process of claim 1, wherein after having been established by the first weld pass yet prior to the second weld pass, the weld seam is substantially free of hot cracks and surface expulsion.

16. The process of claim 1, further comprising:
planishing the weld seam concurrently with or immediately following the first weld pass.

17. The process of claim 1, further comprising:
planishing the weld seam concurrently with or immediately following the second weld pass.

18. The process of claim 1, wherein the first weld pass is carried out at a lower applied current, a greater weld head pressure, and a slower carriage speed than is required to obtain a comparable energy absorption for a comparable gauge high strength low alloy steel sheet welded in a single-pass process.

19. A process for seam welding steel sheets together, comprising:
placing respective end portions of first and second steel sheets in overlapping contact with one another to provide overlapping end portions with opposite first and second sides;
subjecting the overlapping end portions to a first weld pass of a seam welder comprising weld electrodes operating at a first-pass applied current and a first-pass pressure and being moved relative to the overlapping end portions from the first side to the second side of the overlapping end portions at a first-pass carriage speed to pass electric current through the overlapping end portions and establish a weld seam; and
subsequent to the first weld pass, starting at either the first side or the second side of the overlapping end portions and subjecting the weld seam to a second weld pass of the seam welder in which the weld electrodes operate at a second-pass applied current that is lower than the first-pass applied current and a second-pass pressure that is equal to or higher than the first-pass pressure and in which the weld electrodes move relative to the weld seam at a second-pass carriage speed that is greater than the first-pass weld carriage speed to pass electric current through the overlapping end portions and form a weld joint.

20. The process of claim 19, further comprising:
subsequent to the first weld pass, returning the seam welder to the first side of the overlapping end portions at which the first weld pass was started prior to the second weld pass, wherein said second weld pass is started at the first side.

21. The process of claim 19, wherein the weld joint has an energy absorption capability measured by a ball-punch test ASTM 643-84 of at least 50% of an unwelded portion of the steel sheets tested under identical conditions.

22. The process of claim 19, wherein the weld joint has an energy absorption capability measured by a ball-punch test ASTM 643-84 of at least 70% of an unwelded portion of the steel sheets tested under identical conditions.

23. The process of claim 19, wherein the weld joint has an energy absorption capability measured by a ball-punch test ASTM 643-84 of at least 80% of an unwelded portion of the steel sheets tested under identical conditions.

24. The process of claim 19, wherein the first and second steel sheets each have a respective thickness in a range of about 0.5 mm to about 3.0 mm.

25. The process of claim 19, wherein the second-pass applied current is approximately 20 to approximately 80 percent of the first-pass applied current.

26. The process of claim 19, wherein after having been established by the first weld pass yet prior to the second weld pass, the weld seam is substantially free of hot cracks and surface expulsion.

27. The process of claim 19, further comprising:
planishing the weld seam concurrently with or immediately following the first weld pass.

28. The process of claim 19, further comprising:
planishing the weld seam concurrently with or immediately following the second weld pass.

29. A method of continuously processing joined advanced high strength steel sheets, comprising:
placing respective end portions of first and second advanced high strength steel sheets in overlapping contact with one another to provide overlapping end portions with opposite first and second sides;
subjecting the overlapping end portions to a first weld pass of a seam welder comprising weld electrodes operating at a first-pass applied current and a first-pass pressure and being moved relative to the overlapping end portions from the first side to the second side of the overlapping end portions at a first-pass carriage speed to pass electric current through the overlapping end portions and establish a weld seam comprising a weld nugget comprising a martensite phase;
subsequent to the first weld pass, starting at either the first side or the second side of the overlapping end portions and subjecting the weld seam to a second weld pass of the seam welder in which the weld electrodes operate at a second-pass applied current that is lower than the first-pass applied current and at a second-pass pressure and move relative to the weld seam at a second-pass carriage speed to pass electric current through the overlapping end portions and form a weld joint by fusing microcracks, lap openings, and porosity in the weld seam, relieve the residual stress in the weld joint, and temper the martensite phase of the weld nugget; and applying a continuous processing step to the joined advanced high strength steel sheets.

30. The method of claim 29, wherein the weld joint has an energy absorption capability measured by a ball-punch test ASTM 643-84 of at least 50% of an unwelded portion of the advanced high strength steel sheets tested under identical conditions.

\* \* \* \* \*